US007710318B2

(12) United States Patent
Wang et al.

(10) Patent No.: US 7,710,318 B2
(45) Date of Patent: May 4, 2010

(54) METHOD OF ENHANCED COLD START AND ASSOCIATED USER INTERFACE FOR NAVIGATIONAL RECEIVERS

(75) Inventors: David Wang, Belmont, CA (US); Henry Leung, San Jose, CA (US)

(73) Assignee: SIRF Technology, San Jose, CA (US)

(*) Notice: Subject to any disclaimer, the term of this patent is extended or adjusted under 35 U.S.C. 154(b) by 452 days.

(21) Appl. No.: 11/466,871

(22) Filed: Aug. 24, 2006

(65) Prior Publication Data

US 2008/0048910 A1    Feb. 28, 2008

(51) Int. Cl.
*G01S 1/02* (2010.01)
(52) U.S. Cl. .............................. 342/357.15; 342/357.12
(58) Field of Classification Search ............ 342/357.01, 342/357.05, 357.06, 357.12, 357.15; 701/213, 701/215; 455/12.1, 456.1, 456.2
See application file for complete search history.

(56) References Cited

U.S. PATENT DOCUMENTS

| 5,528,248 | A | * | 6/1996 | Steiner et al. .......... 342/357.06 |
| 5,848,373 | A | * | 12/1998 | DeLorme et al. ............ 701/200 |
| 5,889,492 | A | * | 3/1999 | Kurby et al. ............. 342/357.1 |
| 7,215,967 | B1 | * | 5/2007 | Kransmo et al. .......... 455/456.2 |
| 7,388,541 | B1 | * | 6/2008 | Yang .......................... 342/464 |
| 2001/0028321 | A1 | * | 10/2001 | Krasner .................... 342/357.1 |
| 2002/0123352 | A1 | * | 9/2002 | Vayanos et al. ............. 455/456 |
| 2005/0052318 | A1 | * | 3/2005 | Jendbro et al. ............ 342/357.1 |
| 2005/0283503 | A1 | * | 12/2005 | Hancock et al. ............. 707/200 |
| 2006/0152409 | A1 | * | 7/2006 | Raman et al. .......... 342/357.15 |
| 2006/0238418 | A1 | * | 10/2006 | Monnerat et al. ...... 342/357.09 |
| 2007/0103365 | A1 | * | 5/2007 | Pande et al. ............ 342/357.15 |
| 2008/0117103 | A1 | * | 5/2008 | Wang et al. ............ 342/357.13 |
| 2008/0133124 | A1 | * | 6/2008 | Sarkeshik ................... 701/201 |

* cited by examiner

*Primary Examiner*—Dao L Phan
(74) *Attorney, Agent, or Firm*—Pillsbury Winthrop Shaw Pittman, LLP

(57) ABSTRACT

The present invention provides systems and methods for reducing the 'cold start' TTFF of navigation receivers. The systems and methods receive geographical information from a user, such as the nearest city, state or country, and use this geographical information to approximate the position of the receiver. The systems and methods then make use of the approximate position to reduce the 'cold start' TTFF. In an embodiment, the approximate position of the receiver is determined from a co-ordinate database in the receiver based on the geographical information provided by the user. In another embodiment, a user provides geographical information to the receiver through a displayed map with several stages of zooming capability.

34 Claims, 5 Drawing Sheets

| CITY NAME | LONGITUDE | LATITUDE | HEIGHT |
|---|---|---|---|
| | | | |
| SAN JOSE | xx.xxxx | yy.yyyy | hh.hhhh |
| | | | |
| LOS ANGELES | aa.aaaa | bb.bbbb | cc.cccc |
| | | | |
| SAN DIEGO | dd.dddd | ee.eeee | ff.ffff |
| | | | |
| | | | |
| | | | |
| | | | |
| | | | |
| | | | |
| | | | |
| | | | |

FIG. 2

| STATE NAME | LONGITUDE | LATTITUDE | HEIGHT |
|---|---|---|---|
|  |  |  |  |
| ARIZONA | xx.xxxx | yy.yyyy | hh.hhhh |
|  |  |  |  |
| CALIFORNIA | aa.aaaa | bb.bbbb | cc.cccc |
|  |  |  |  |
|  |  |  |  |
|  |  |  |  |
|  |  |  |  |
|  |  |  |  |
|  |  |  |  |
|  |  |  |  |
|  |  |  |  |
|  |  |  |  |
|  |  |  |  |

FIG. 3

METHOD OF ENHANCED COLD START AND ASSOCIATED USER INTERFACE FOR NAVIGATIONAL RECEIVERS

FIELD OF THE INVENTION

The present invention relates generally to navigational systems, and more particularly to systems and methods for faster cold start using approximate geographical location and associated techniques for providing the approximate geography location.

BACKGROUND OF THE INVENTION

With the development of radio and space technologies, several satellites based navigation systems have already been built and more will be in use in the near future. One example of such satellites based navigation systems is Global Positioning System (GPS), which is built and operated by the United States Department of Defense. The system uses twenty-four or more satellites orbiting the earth at an altitude of about 11,000 miles with a period of about twelve hours. These satellites are placed in six different orbits such that at any time a minimum of six satellites are visible at any location on the surface of the earth except in the polar region. Each satellite transmits a time and position signal referenced to an atomic clock. A typical GPS receiver locks onto this signal and extracts the data contained in it. Using signals from a sufficient number of satellites, a GPS receiver can calculate its position, velocity, altitude, and time. The Russian built GLONASS and the European Union proposed Galileo are the two other important satellite based navigation systems.

A GPS receiver has to acquire and track at least four satellite signals before starting to compute the position which is also known as position fix. The time required to fix the position depends upon how fast the satellite signals can be acquired and tracked. This signal acquisition involves a search of the carrier frequency including the Doppler due to the motion between the satellite and the navigation receiver. In addition to this frequency search the receiver should also search for the actual code phase of the received signal. Thus the search is a two dimensional search and takes most of the Time-To-First-Fix (TTFF). It is always desirable to lower this TTFF so that a fast position estimation is possible. This resulted in the operation of the receiver in different modes such as 'hot start', 'warm start' and 'cold start'. In the 'hot start' mode the receiver has current ephemeris and the position and time, and therefore the list of the visible satellites and the Doppler associated with each satellite may be determined. Thus only the visible satellites are searched. Since the carrier frequency including the Doppler is known, the frequency search range or the number of frequency bins that need to be searched is also decreased. Thus the 'hot start' results in a shorter TTFF of usually around 7-10 seconds. In 'warm start' the receiver has non-current ephemeris but the initial position and time are known as accurately as in the case of 'hot start'. Thus the Doppler cannot be determined accurately as in the case of 'hot start' due to the higher number of frequency bins that need to be searched. Thus the 'warm start' TTFF has a typical value of 30-35 seconds. In the third mode, known as 'cold start', the receiver has no knowledge of position, time or ephemeris but may have almanac in the memory. Thus a search for all the satellites in the constellation is required. In addition to this the Doppler frequency is also not known. As a result the frequency search range in this case is far wider with a large number of frequency bins. Thus the receiver in the 'cold start' mode has the highest TTFF, which can be as large as 80-100 seconds.

It is not always possible to store the above information in the receiver at all times or the receiver might have moved over a long distance before the receiver is powered on. Under such conditions it is necessary to resort to 'cold start'.

Therefore, there is a need to reduce the 'cold start' TTFF of navigation receivers.

SUMMARY

Accordingly, the present invention provides systems and methods for reducing the 'cold start' TTFF of navigation receivers.

The systems and methods receive geographical information from a user, such as the nearest city, state or country, and use this geographical information to approximate the position of the receiver. The systems and methods then make use of the approximate position to reduce the 'cold start' TTFF. This is possible because most of the visible satellites at the unknown location are the same as that of the nearest city or state or country (small state or country assumed). Further, the change in Doppler frequency at the unknown location with respect to the nearest city or within the state or country may be small or negligible. The navigation data bit edge ambiguity is also reduced thus reducing the time for data decode.

In an embodiment, the approximate position of the receiver is determined from a co-ordinate database in the receiver based on the geographical information provided by the user.

In another embodiment, a user provides geographical information to the receiver through a displayed map with several stages of zooming capability.

The above and other advantages of embodiments of this invention will be apparent from the following more detailed description when taken in conjunction with the accompanying drawings.

BRIEF DESCRIPTION OF THE DRAWINGS

FIG. 2 shows an exemplary database of cities and associated co-ordinates according to an embodiment of the invention.

FIG. 3 shows an exemplary database of states and associated co-ordinates according to an embodiment of the invention.

DETAILED DESCRIPTION

Figure 1:
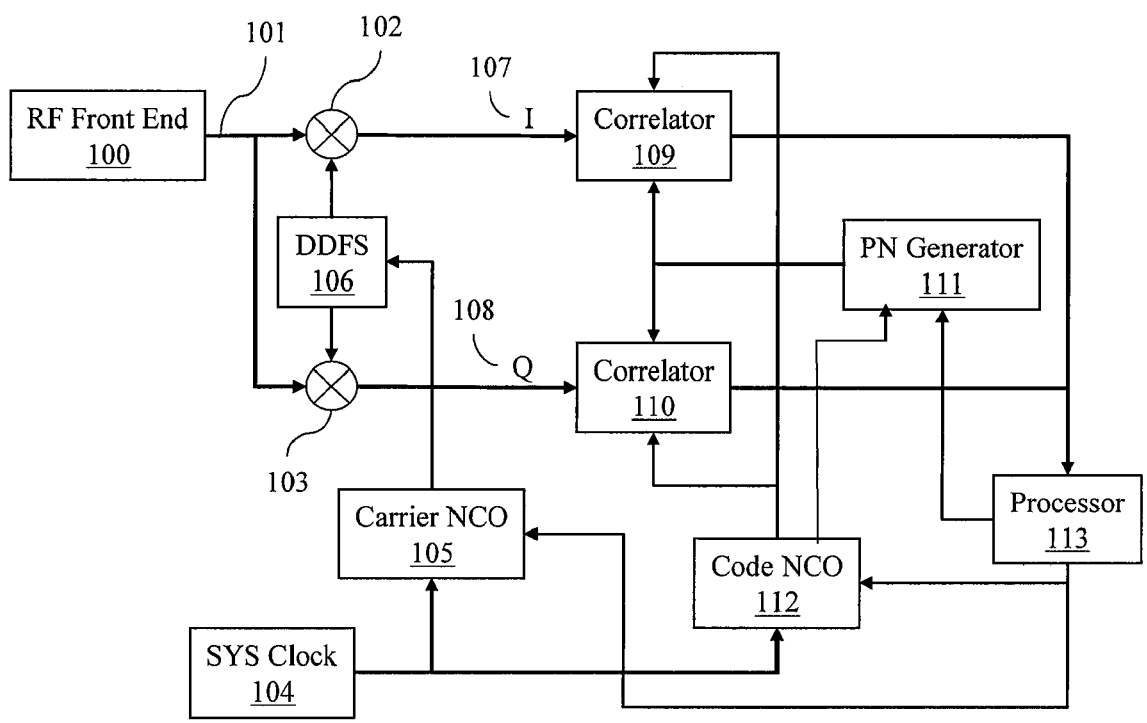
FIG. 1 is a block diagram illustrating a GPS receiver according to an embodiment of the invention.

FIG. 1 illustrates a receiver according to a preferred embodiment of the invention. An intermediate frequency (IF) signal input 101 enters a baseband section of the receiver from an analog-to-digital converter (ADC) output of a conventional RF front-end 100. The IF input is multiplied in IF mixers 102 and 103 in-phase and in quadrature, respectively, with a local frequency signal generated by a direct digital frequency synthesizer (DDFS) 106. This mixing involves multiplying the ADC output 101 by the local DDFS frequency in-phase which generates the in-phase component I 107. In a parallel path the same signal 101 is multiplied by the DDFS frequency in quadrature (i.e., with a phase shift of 90 degrees) to produce quadrature component Q 108. The DDFS 106 is driven by a carrier numerically controlled oscillator (NCO) 105. In addition, carrier NCO 105 receives phase and frequency corrections from a processor 113. Because of this correction, the DDFS frequency and phase is almost the same as that of the ADC output 101. Thus the I and Q signals produced by the IF mixers 102 and 103 are at near zero carrier frequency after being low-pass filtered to remove the high frequency components which are at twice the IF frequency band.

The I and Q components 107 and 108 are correlated in correlators 109 and 110, respectively, with a locally-generated PRN sequence generated by a PRN generator 111. The PRN-sequence corresponds to the satellite whose signal is being processed by the baseband section at that time. The PRN sequence generator is driven by code NCO 112. The local code frequency is made equal to the code rate of I and Q paths by corrective feedback from processor 113 to the code NCO 112. In addition, processor 113 sends a signal to PRN code generator 111 to set the starting phase of the locally generated code. The NCO 112 provides the correct clock signals to correlators 109 and 110. For example, NCO 112 provides a clock signal to generate two samples per PRN chip in the signal acquisition stage and three samples per chip during the tracking stage. SYS CLK 104 provides to NCO 105 and NCO 112 a common clock synchronization signal. The correlator outputs are then sent to processor 113 at every millisecond interval. The processor 113 is preferably a digital signal processor (DSP) core suitable for high speed arithmetic computations. Subsequent processing of the signals take place in the processor 113, as will be described in detail below. Additional details of the receiver baseband section described above are contained in U.S. patent application Ser. No. 11/123,861 filed on May 6, 2005, the specification of which is incorporated herein by reference.

The improvement in the TTFF or enhanced cold start due to the approximately known receiver location is described here. In the normal cold start mode the receiver searches for all the satellites in all possible frequency bins and then acquires the signal. Once the signal is acquired the receiver proceeds to detect the navigation data bit edge at one of the twenty possible one millisecond intervals. The systems and methods of the present invention may detect the first satellite data bit edge in a similar manner. In present day receivers, this procedure is repeated with each of the other satellites. However, in the systems and methods of the present invention, the timing is obtained from the first satellite signal. Using this timing, the approximate receiver location and the almanac, the receiver can determine the bit edges of all the other visible satellite signals with an accuracy of one millisecond. Thus the twenty millisecond second uncertainty reduces to +/−1 millisecond uncertainty with a corresponding reduction in the search time. In addition, the receiver can determine the visible satellites, thereby reducing the number of satellites that need to be searched. Thus this results in a reduction of the TTFF. The accuracy of the position can be +/−150 KMs as one millisecond corresponds to a distance of 300 KMs. If the approximate time is known, it is not necessary to determine the same from the first satellite signal, thereby further reducing the TTFF. This improvement increases with the accuracy of the predicted time.

FIG. 2 shows an exemplary form of database of cities with associated co-ordinates in latitude, longitude and optionally height. The database may also include locations or landmarks with associated co-ordinates in latitude, longitude and optionally height. The co-ordinates may be the co-ordinates of the geographical center of the cities and landmarks. The database may also include areas which are the states of a country with associated co-ordinates of the geographical center of the areas or states. FIG. 3 shows a database of states with co-ordinates of their geographical center points. The areas considered need not be constrained to states alone. The area may be a county, a district or even a small country. Further, it is possible to define custom made areas comprising several states or part of the states. The custom made areas may be defined by a rectangular or circular border on a map.

In the normal cold start mode of a typical navigation receiver the receiver memory contains no information on present or prior position, ephemeris and time. In some cases memory may contain a location which is far away from the present position. Under these conditions the receiver starts to search all the satellites with all search frequency bins. This takes a long time resulting in a long TTFF. However, in such instances the user may have some information regarding the new location, which can be used to reduce the acquisition time. For example, the user may know the nearest city but not its co-ordinates. In such cases the user can provide the location information by selecting the city name from a drop down list on the receiver display. The receiver uses the city name to find the center co-ordinates of the city from the database and uses the center co-ordinates as the initial position of the receiver.

In another embodiment the user may be aware of the area but not the nearby city. In such cases, the user can select the area which may be a state, a group of states, a county or a group of counties. In such cases, the list may include the names of states, counties or region, etc. The list may also even include the name of small countries. The user selects the appropriate area from the list. Under such cases the receiver takes the co-ordinates of the center of the area as the approximate position of the receiver and proceeds to compute the visible satellite list and associated Doppler values. The receiver then tries to acquire the signals.

In another embodiment the location provided by the user need not be a city or state but may be some landmark or any pre-defined location that is recognizable by the user and whose co-ordinates are known. In this embodiment, the database in the receiver may include a list of landmarks or pre-defined locations with associated co-ordinates, and the user selects a landmark or pre-defined location from the list. The locations may include airports, train stations, and other location where the receiver may be powered on after traveling a long distance.

In cases where the receiver has no timing information the time may be provided by the user. The user may estimate the time through his watch, by the position of the sun during the day or by the position of the stars during night time.

The receiver performance can further be improved by providing both the approximate position and the time as above.

Figure 4:
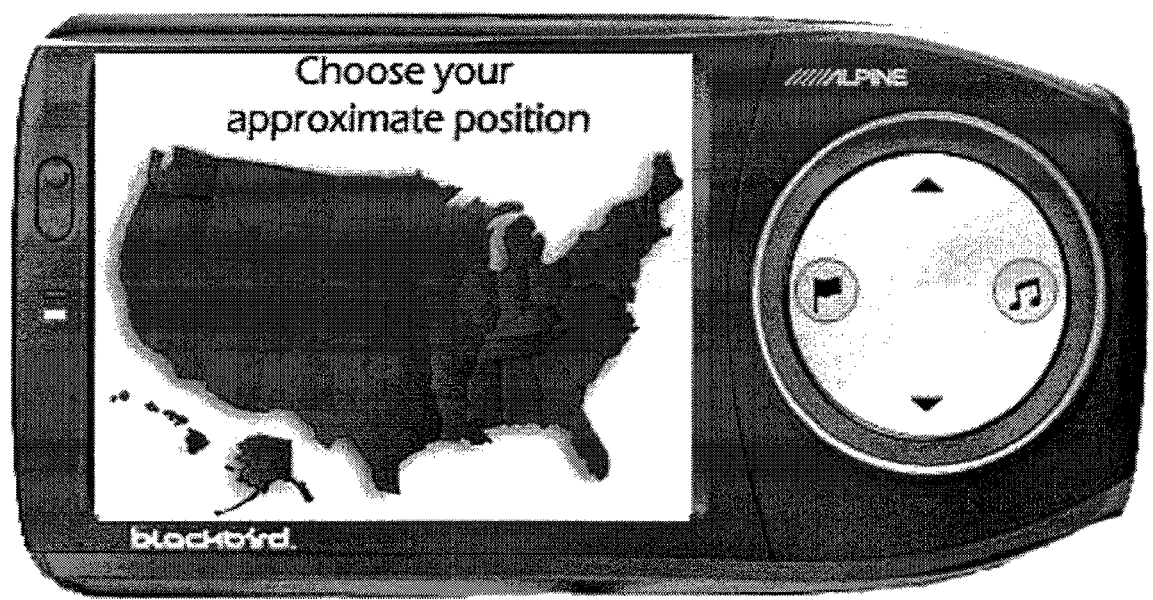
FIG. 4 illustrates a dialog to select approximate geographical position on a map according to an embodiment of the invention.
Figure 5:
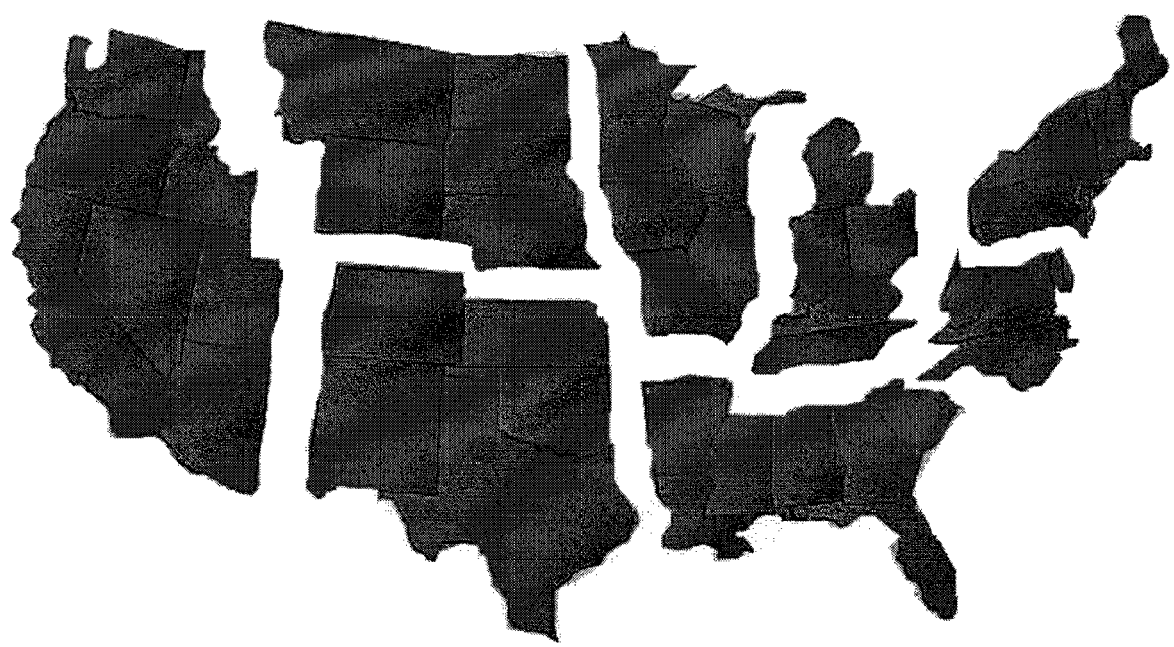
FIG. 5 illustrates possible divisions of states for a second "zoomed in" dialog.

Under certain circumstances, selecting items from a drop-down list can be somewhat tedious, such as while driving. Further, the accuracy of the location information may be limited. Therefore, an embodiment involving user interface through a map is also provided. In this embodiment, a map of a country or any suitable area is displayed on the receiver display as shown in FIG. 4. The user pinpoints the approximate position on this display. The display may be a touch screen with the user pinpointing the approximate position on the map by touching the screen. The user may also pinpoint the approximate position using a track ball. Any display selection tool may be used to pinpoint the location on the map. If the resulting accuracy is sufficient, the receiver computes the longitude and latitude of the location and sends it to the receiver computation engine for enhanced cold start. Various levels of zooming as shown in FIG. 5 may be employed to improve the positioning accuracy. FIG. 5 shows a possible division of states for a second "zoomed in" level. The user may zoom in a certain area by touching the area on a touch screen and activating a zooming function by, e.g., touching a "zoom" button on the screen. The screen may also have different "zoom" level buttons so that the user can immediately zoom to a desired "zoom" level.

Although the present invention has been described in terms of the presently preferred embodiments, it is to be understood that the disclosure is not to be interpreted as limiting. Various alterations and modifications will no doubt become apparent to those skilled in the art after having read this disclosure. For example, although the above embodiments have been described using the GPS system as an example, the techniques and methods may be used for other global satellite navigational systems including GLONASS, Galileo, secondary systems such as WASS, EGNOS, and MSAS, as well as hybrids of the above systems and also to any type direct sequence spread spectrum receivers. Accordingly, it is intended that the appended claims be interpreted as covering all alterations and modifications as fall within the spirit and scope of the invention.

What is claimed is:

1. A method for reducing the start time of a navigational receiver, comprising:
   receiving approximate signal acquisition aiding parameters from a user; and
   using the approximate signal acquisition aiding parameters to acquire navigation satellite signals.

2. The method of claim 1, wherein the parameters include an approximate geographical location of the receiver.

3. The method of claim 1, wherein the parameters include an approximate time of day.

4. The method of claim 1, wherein the parameters include an approximate geographical location of the receiver and an approximate time of day.

5. A method for reducing the start time of a navigational receiver, comprising:
   receiving approximate signal acquisition aiding parameters from a user, wherein the receiver includes a database of geographical locations and corresponding co-ordinates;
   using the approximate signal acquisition aiding parameters to acquire navigation satellite signals;
   having the user select a geographical location from the database; and
   using the co-ordinates in the database for the selected geographical location as an approximate location of the receiver to acquire the navigation satellite signals.

6. The method of claim 5, wherein the geographical location is a city.

7. The method of claim 5, wherein the geographical location is a state or province and the corresponding co-ordinates in the database is a geographic center of the state or province.

8. The method of claim 5, wherein the geographical location is a country and the corresponding co-ordinates in the database is a geographic center of the country.

9. The method of claim 5, wherein the geographical location is a point or area on the surface of the earth with associated co-ordinates.

10. The method of claim 2, wherein the user selects the approximate geographical location from a database.

11. The method of claim 10, wherein the database includes a database of cities.

12. The method of claim 10, wherein the database includes a database of states or provinces.

13. The method of claim 10, wherein the database includes a database of locations or areas on the surface of the earth.

14. The method of claim 2, wherein the user selects the approximate geographical location from a displayed map.

15. The method of claim 14, wherein the receiver enables the user to zoom in a selected area of the map to improve accuracy of the location selection.

16. The method of claim 14, wherein the map is displayed on a touch screen and the user pinpoints the location on the map by touching the touch screen.

17. The method of claim 14, wherein the user uses a track ball to pinpoint the location on the map.

18. A navigational receiver, comprising:
   a user interface;
   satellite signal receiver section; and
   a processor coupled to the satellite signal receiving section and the user interface,
   wherein the processor is configured to receive approximate signal acquisition aiding parameters from a user via the user interface, and use ifie approximate signal acquisition aiding parameters to acquire satellite signals from ihe satellite signal receiver section.

19. The navigational receiver of claim 18, wherein the parameters include an approximate geographical location of the receiver.

20. The navigational receiver of claim 18, wherein the parameters include an approximate time of day.

21. The navigational receiver of claim 18, wherein the parameters include an approximate geographical location of the receiver and an approximate time of day.

22. The navigational receiver of claim 18, further comprising a database of geographical locations and corresponding co-ordinates, wherein the processor is configure to receive a geographical location selected by a user from the database, and use the co-ordinates in the database for the selected geographical location as an approximate location of the receiver to acquire the satellite signals.

23. The navigational receiver of claim 22, wherein the geographical location is a city.

24. The navigational receiver of claim 22, wherein the geographical location is a state or province and the corresponding co-ordinates in the database is a geographic center of the state or province.

25. The navigational receiver of claim 22, wherein the geographical location is a country and the corresponding co-ordinates in the database is a geographic center of the country.

26. The navigational receiver of claim 22, wherein the geographical location is a point or area on the surface of the earth with associated co-ordinates.

27. The navigational receiver of claim 19, further comprises a database of geographic locations, wherein the user selects the approximate geographical location from the database.

28. The navigational receiver of claim 27, wherein the database includes a database of cities.

29. The navigational receiver of claim 27, wherein the database includes a database of states or provinces.

30. The navigational receiver of claim 27, wherein the database includes a database of locations or areas on the surface of the earth.

31. The navigational receiver of claim 19, wherein the user interface includes a display, and the receiver enables the user selects the approximate geographical location from a map on the display.

32. The navigational receiver of claim 31, wherein the receiver enables the user to zoom in a selected area of the map to improve accuracy of the location selection.

33. The navigational receiver of claim 31, wherein the user interface includes a touch screen, and the receiver enables the user to pinpoint the location on the map by touching the touch screen.

34. The navigational receiver of claim 31, wherein the user interface includes a track ball, and the receiver enables the user to pinpoint the location on the map using the track ball.

* * * * *

UNITED STATES PATENT AND TRADEMARK OFFICE
CERTIFICATE OF CORRECTION

| | | |
|---|---|---|
| PATENT NO. | : 7,710,318 B2 | Page 1 of 1 |
| APPLICATION NO. | : 11/466871 | |
| DATED | : May 4, 2010 | |
| INVENTOR(S) | : Wang et al. | |

It is certified that error appears in the above-identified patent and that said Letters Patent is hereby corrected as shown below:

On the Title Page, in Field (75), under "Inventors", in Column 1, Line 1, delete "David Wang," and insert -- David J. Wang, --, therefor.

In Column 6, Line 8, in Claim 18, delete "ifie" and insert -- the --, therefor.

In Column 6, Line 9, in Claim 18, delete "ihe" and insert -- the --, therefor.

Signed and Sealed this
Twenty-fifth Day of September, 2012

David J. Kappos
*Director of the United States Patent and Trademark Office*